Patented Dec. 5, 1922.

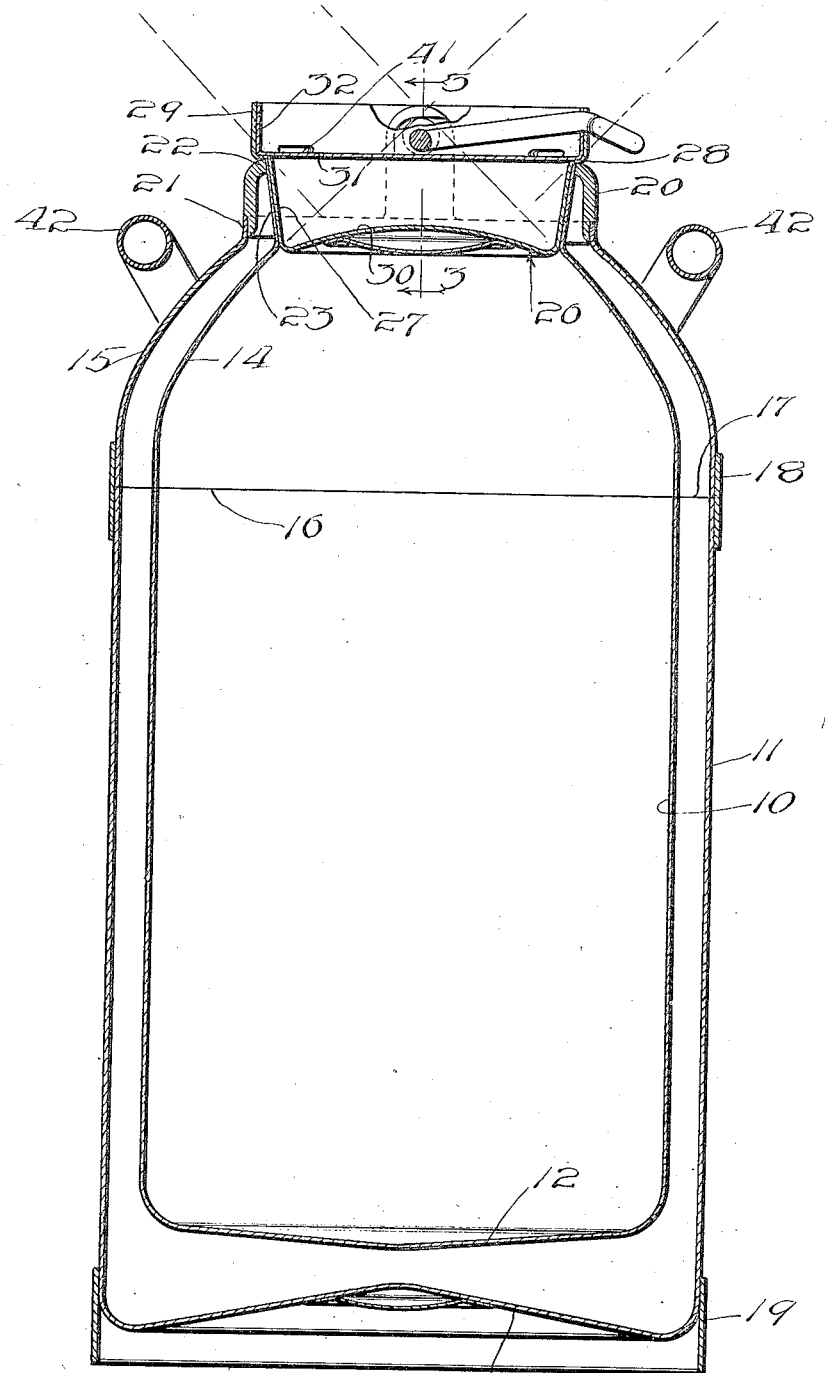

1,437,647

UNITED STATES PATENT OFFICE.

C. ROY GLEASON, OF CHICAGO, ILLINOIS.

VACUUM-INSULATED CAN.

Application filed March 26, 1918. Serial No. 224,800.

*To all whom it may concern:*

Be it known that I, C. ROY GLEASON, a citizen of the United States, and a resident of Chicago, in the county of Cook and State of Illinois, have invented certain new and useful Improvements in Vacuum-Insulated Cans; and I do hereby declare that the following is a full, clear, and exact description thereof, reference being had to the accompanying drawings, and to the characters of reference marked thereon, which form a part of this specification.

This invention relates to a novel vacuum insulated receptacle of that type comprising an inner and an outer shell, with the space between the same sealed and exhausted to produce a high vacuum so as to thereby insulate the contents of the receptacle.

The invention relates more specifically to a novel vacuum insulated milk can for shipping or storing milk and cream, although it may be used for shipping or storing other commodities which require to be maintained at a substantially constant temperature.

Among the objects of the invention is to provide a novel form of milk can which is so constructed and arranged that all parts of the inner wall of the can are easily accessible for the purpose of cleaning the same, and all parts of said inner wall may be readily inspected.

A further object of the invention is to provide a novel arrangement of the rim which encircles the mouth of the can and means for attaching it to the sheet metal walls of the can so as to support the inner shell from the outer shell.

Another object of the invention is to so form the opposing bottom walls of the inner and outer receptacles as to avoid crushing pressure on said walls such as would tend to fracture the walls and cause leaks in the end walls and at the junction between said walls and the vertical walls of the receptacle.

Further objects of the invention are to improve and simplify vacuum insulated cans, and the invention consists in the combination and arrangement of the parts shown in the drawing and described in the specification, and is pointed out in the appended claims.

The figure of the drawing is a vertical section of a vacuum insulated milk can embodying my invention.

The body of the can comprises an inner shell 10 and an outer shell 11, shown as made cylindric. Said shells are formed with integral bottoms 12 and 13, respectively, and are formed at their upper ends to provide curved breast sections 14 and 15, respectively. Preferably the breast sections are made as parts separate from the main bodies of the inner and outer shells and are welded or otherwise joined to said main bodies of the shells along the indicating lines 16 and 17, respectively. The outer shell is preferably encircled at the line of junction of the main body of the shell and the breast section 15 by a breast band 18. The can is supported on a base ring 19 which extends a distance below the lower wall or bottom 13 of the outer shell.

The bottom walls 12 and 13 are curved at their central portions toward the vacuum and are joined at their margins to the vertical cylindric walls along curved lines formed on rather long radii. These formations of the bottom walls have the effect of overcoming bending or crushing stresses being exerted on the walls tending to crush or fracture the same, such as would occur if the bottom opposing walls were flat. The juncture of the end walls with the vertical walls along curved lines reinforces the wall structures at these places, as compared to walls meeting at right or substantially right angles. Thus the opposing walls are self sustaining against pressure crushing due to a very high vacuum.

20 designates the rim of the can which surrounds the can neck. Said rim is preferably made of forged steel or like material of the proper strength. The lower margin of the rim fits closely within an upwardly turned cylindric flange 21 of the outer breast section and is welded or soldered to said flange. The upper margin of the rim is turned inwardly at 22, to produce an inwardly overhanging flange effect. The inner breast section 14 terminates in an outwardly flaring or conical neck 23 which fits closely in the overhanging flanged portion 22 of the rim and is soldered or welded thereto.

26 designates, as a whole, the cover which fits within the neck of, and closes the can. Said cover is a hollow structure and the space enclosed by its walls is exhausted of air to produce a high vacuum. The side wall 27 of the cover is outwardly tapered or flared to fit the neck 23 of the inner breast section, and said tapered wall 27 is turned outwardly at 28 to provide a downwardly facing shoulder which fits over the flange 22 of the rim 20; the wall terminating in a cylindric flange 29. The bottom wall 30, as well also as are the bottom walls of the inner and outer shells, is bowed or curved toward the air exhausted space which it partially bounds, as is usual in such construction. The wall 31 of the cover is formed with an upstanding cylindric flange 32 which fits closely the cylindric flange 29 of the side wall of the cover to produce a rigid rim for the cover.

The cover may be clamped in the flaring neck by any suitable locking means to seal the can against entrance thereto of extraneous matter.

The can is provided with two handles 42 which are soldered or otherwise suitably secured to the outer breast section 15 adjacent to the neck of the can. Said handles are so proportioned and located as to be within the cylindric dimension of the can, so that the can may lie on its side without bringing the handles in contact with the surface on which the can is supported. Thereby is avoided danger of breakage of the handles from the can in event the can is overturned. This arrangement also permits the can to be rolled in the manner of a barrel, the handles not interfering with such rolling action. It will be understood that the joints at the junction of the inner and outer breast sections with the rim 20 are sealed by a suitable soldering or welding process so as to prevent air leaking into the space between the shells. The construction and arrangement of the rim is such that the inner shell and its contents are well supported from the outer shell, and the arched arrangement of the breast sections produces a strong and rigid connection between the parts. It will be noted, furthermore, by reason of the fact that the cover fits as a tapered fit closely within the neck 23, the can structure is further braced at the neck portion thereof where the inner shell is suspended, through the rim member 20, from the arched outer shell, and, further, that said cover is clamped with a downwardly facing shoulder on the inwardly turned portion 22 of the rim member 20. All of this goes to produce a rigid reinforced connection which tends to prevent pendulum movement of the inner shell member. By reason of the fact that the inner shell member is thus supported from the outer shell member instead of by braces at or near the lower end thereof, the vacuum is more dependable because of the relatively long path for conduction of heat to the wall of the inner shell.

An advantage of the particular form of breast section shown is that the entire inner face of the inner breast section may be observed when the cover is removed, it being obvious that by looking into the open can from different angles along the dotted lines applied to Figure 1, or in any direction between them, the inner surface of the inner breast section below the flaring neck may be perfectly inspected. This construction and arrangement is particularly valuable as an aid to inspecting the cans, making it unnecessary for the inspector to place his hands within the overhanging breast portion of the can to determine whether or not the can is clean. This arrangement is also advantageous in that it facilitates the emptying of the contents of the can.

It will be understood that the main body is made of sheet metal of suitable gauge, and that all the parts of the can proper, including the shell sections 10 and 11, the breast sections 14 and 15, and the rim 20 are welded or soldered to constitute a solid finished unit which is strong and durable.

Variations in the structural details may be made without departure from the spirit and scope of the invention, and the invention is not intended to be limited to the particular construction shown, except as to claims where said structure is particularly set forth, and as imposed by the prior art.

I claim as my invention:

1. A vacuum insulated can comprising spaced inner and outer shells, closed but non-contacting at their bottoms and open at their tops at the neck of the can, and a relatively massive, separately formed, ring permanently connected between the upper open marginal portions of said shells, said ring constituting a part of the sealing means for the vacuum space between the shells and part of the outer wall of the can at the neck, and constituting means by which the inner shell is supported from the shell.

2. A vacuum insulated can comprising spaced inner and outer shells, closed but non-contacting at their bottoms and open at their tops at the neck of the can, and a relatively massive, separately formed, ring permanently connected between the upper open marginal portions of said shells, said ring constituting a part of the sealing means for the vacuum space between the shells and part of the outer wall of the can at the neck, and constituting means by which the inner shell is supported from the shell, said inner shell having a portion constituting an outwardly flaring mouth and extending through said ring and fixed thereto, and a tapered cover fitting the flaring mouth portion and reinforcing the structure to counteract the tendency of swinging movement of the inner shell.

3. A vacuum insulated can comprising spaced inner and outer shells, with the air exhausted from the space between the shells, each embracing an upper breast section, and the breast section of the inner shell extending beyond the breast section of the outer shell to form a neck for the can, and a ring fitted within and attached to the upper end of the breast section of the outer shell and within which said neck fits at its upper end and to which it is attached to constitute the sole suspension for the inner shell, said shells being wholly out of contact below said ring and the ring constituting the sole seating means between the shell at the top of the can.

4. A can comprising inner and outer spaced shells, with the space between them adapted to be evacuated, each shell consisting of a main body portion with an integral bottom wall and an upper, inwardly curved breast section, the inner section terminating in a neck, said breast sections being welded to the main portions of the shells to constitute solid units, and a separately formed, relatively massive ring fitted within and secured to the upper end of the outer breast section and closely embracing and brazed to the upper end of said neck.

5. A vacuum insulated can comprising spaced inner and outer shells, with the air adapted to be exhausted from the space between the shells, each embracing an upper breast section, and the breast section of the inner shell extending beyond the breast section of the outer shell to form a neck for the can, a ring fitted within the outer end of the breast section of the outer shell and attached thereto and within which said neck fits to suspend the inner shell from the ring member, the said neck being outwardly and upwardly tapered, and a tapered cover fitting tightly within the neck.

6. A vacuum insulated can comprising spaced inner and outer shells, with the air adapted to be exhausted from the space between the shells, each embracing an upper breast section, and the breast section of the inner shell extending beyond the breast section of the outer shell to form a neck for the can, a ring member fitted within the outer end of the breast section of the outer shell and attached thereto and within which said neck fits to suspend the inner shell from the ring member, the said neck being outwardly and upwardly tapered, and a tapered cover fitting tightly within the neck, said cover being provided with a downwardly facing shoulder to fit on the upper portion of the ring member.

7. A vacuum insulated can comprising spaced inner and outer shells, with the air adapted to be exhausted from the space between the shells, each embracing an upper breast section, and the breast section of the inner shell extending beyond the breast section of the outer shell to form a neck for the can, a ring member fitted within the outer end of the breast section of the outer shell and attached thereto and within which said neck fits to suspend the inner shell from the ring member, the said neck being outwardly and upwardly tapered, and a tapered cover fitting tightly within the neck, the lower wall of said cover being arched to further strengthen the structure.

8. A vacuum insulated can comprising spaced inner and outer shells, closed but non-contacting at their bottoms and open at their tops at the neck of the can, and a relatively massive, separately formed, ring permanently connected between the upper open marginal portions of said shells, said ring constituting a part of the sealing means for the vacuum space between the shells and part of the outer wall of the can at the neck, and constituting means by which the inner shell is supported from the shell, said inner shell having a portion constituting an outwardly flaring mouth and extending through said ring and fixed thereto, and a tapered cover fitting the flaring mouth portion and reinforcing the structure to counteract the tendency of swinging movement of the inner shell, the inner shell at the breast portion being curved and so related to the diameter of the mouth that all parts of the curved breast portion may be inspected through the mouth portion at different angles.

9. A vacuum insulated can comprising spaced inner and outer shells having opposing walls integral with the bodies of the shells, with a ring member to connect the shells to produce an air tight space between them, the opposing walls of both said shells being centrally curved towards a vacuum between said walls.

10. A vacuum insulated can comprising spaced inner and outer shells having opposing walls integral with the bodies of the shells, with a ring member to connect the shells to produce an air tight space between them, the opposing walls of both said shells being centrally curved towards a vacuum therebetween, and said opposing walls being joined to the walls of the shell bodies along curved lines to resist crushing pressure at the junctions thus formed.

In testimony whereof I claim the foregoing as my invention, I hereunto append my signature at Chicago, Illinois, this 18th day of March, 1918.

C. ROY GLEASON.